United States Patent [19]
Tsumiyama et al.

[11] Patent Number: 5,852,165
[45] Date of Patent: Dec. 22, 1998

[54] TERPOLYMER POLYAMIDE, POLYAMIDE RESIN COMPOSITION CONTAINING THE SAME, AND AUTOMOTIVE PARTS OBTAINING FROM THESE

[75] Inventors: Tatsuo Tsumiyama; Tadahisa Kanayama, both of Yamaguchi, Japan

[73] Assignee: UBE Industries, Ltd., Ube, Japan

[21] Appl. No.: 453,410

[22] Filed: May 30, 1995

[30] Foreign Application Priority Data

| May 31, 1994 | [JP] | Japan | 6-118393 |
| Jun. 17, 1994 | [JP] | Japan | 6-135917 |
| Jul. 29, 1994 | [JP] | Japan | 6-178619 |

[51] Int. Cl.$^6$ ............ C08G 69/26; C08L 77/00
[52] U.S. Cl. ............ 528/332; 528/310; 528/322; 528/335; 528/336; 528/349; 525/420; 525/432; 524/411; 524/600; 524/606
[58] Field of Search ............ 525/420, 432; 528/336, 349, 335, 332, 310, 322; 524/600, 606, 411

[56] References Cited

U.S. PATENT DOCUMENTS

| 4,076,664 | 2/1978 | Pagilagan | 528/335 |
| 4,218,509 | 8/1980 | Edgar et al. | 528/339 |
| 5,071,924 | 12/1991 | Koch et al. | 525/432 |
| 5,182,336 | 1/1993 | Abe et al. | 525/397 |
| 5,256,718 | 10/1993 | Yamamoto et al. | 524/411 |
| 5,482,998 | 1/1996 | Muehlbach et al. | 525/66 |

FOREIGN PATENT DOCUMENTS

| 0 234 819 A3 | 9/1987 | European Pat. Off. . |
| 0 382 048 A2 | 8/1990 | European Pat. Off. . |
| 0 509 282 A3 | 10/1992 | European Pat. Off. . |
| 0 519 248 A1 | 12/1992 | European Pat. Off. . |
| 0 550 308 A1 | 7/1993 | European Pat. Off. . |
| 0 583 782 A1 | 2/1994 | European Pat. Off. . |
| 2 324 159 | 11/1974 | Germany . |
| A-52-062399 | 5/1977 | Japan . |
| A-58-120665 | 7/1983 | Japan . |
| B-62-014180 | 4/1987 | Japan . |
| B-64-011072 | 2/1989 | Japan . |
| A-1-098665 | 4/1989 | Japan . |
| A-2-240162 | 9/1990 | Japan . |
| 3-028591 | 2/1991 | Japan . |
| A-3-069359 | 3/1991 | Japan . |
| A-3-285951 | 12/1991 | Japan . |
| A-4-198264 | 7/1992 | Japan . |
| A-5-032888 | 2/1993 | Japan . |
| A-5-043768 | 2/1993 | Japan . |
| A-5-117525 | 5/1993 | Japan . |

OTHER PUBLICATIONS

Communication from European Patent Office in European Application No. 96302781.8.

European Search Report concerning European Patent Application 95303685.2, dated Mar. 13, 1996 (4 pages).

Primary Examiner—P. Hampton-Hightower
Attorney, Agent, or Firm—Panitch Schwarze Jacobs & Nadel, P.C.

[57] ABSTRACT

A crystalline terpolymer polyamide produced from: (a) an equimolar salt of hexamethylenediamine with adipic acid, (b) an equimolar salt of hexamethylenediamine with terephthalic acid, and (c) 12-aminododecanoic acid or ω-laurolactam; a polyamide resin composition comprising (A) the terpolymer polyamide and (B) a modified polyolefin; a polyamide resin composition comprising (A) the terpolymer polyamide, (B) the modified polyolefin, and (C) polyamide 12; a polyamide resin composition comprising (A) the terpolymer polyamide and (D) an inorganic filler and/or a flame retardant; and an automotive part comprising a molding one of these terpolymer polyamide and polyamide resin compositions.

12 Claims, 1 Drawing Sheet

TERPOLYMER POLYAMIDE, POLYAMIDE RESIN COMPOSITION CONTAINING THE SAME, AND AUTOMOTIVE PARTS OBTAINING FROM THESE

FIELD OF THE INVENTION

The present invention relates to a terpolymer polyamide, a polyamide resin composition containing the same, and automotive parts obtained from these. More particularly, the present invention relates to a terpolymer polyamide excellent in heat resistance, oil resistance, toughness, dimensional stability, mechanical strength, molding stability, and suitability for a high cycling process, and a polyamide resin composition containing the same. This invention also relates to automotive parts which take advantage of these excellent properties of the terpolymer polyamide and the polyamide resin composition containing the polyamide.

BACKGROUND OF THE INVENTION

Polyamide resins are generally characterized as being excellent in heat resistance, oil resistance, moldability, rigidity, toughness, etc. The applications of polyamide resins have hence spread to power tools, general-purpose industrial parts, machine parts, electrical parts, electronic parts, interior and exterior automotive parts, and various functional parts such as automotive parts for use in engine compartments and parts for automotive electrical equipment.

However, aliphatic polyamides have a problem that since the water absorption thereof is high, moldings of such aliphatic polyamides undergo considerable fluctuations in dimension and physical properties upon water absorption.

Also known besides such aliphatic polyamides are aromatic polyamides. The aromatic polyamides are obtained by the polycondensation of aromatic dicarboxylic acids with aliphatic diamine.

These aromatic polyamides have low water absorption unlike aliphatic polyamides, so that use of the aromatic polyamides is effective in eliminating the above-described problem that moldings undergo fluctuations in dimensional accuracy, physical properties, etc. upon water absorption. Another advantage of the aromatic polyamides is that since they generally have higher melting-points than aliphatic polyamides, they are superior in heat resistance.

However, a close investigation on moldings obtained from aromatic polyamides has revealed that these moldings are inferior in toughness, i.e., elongation, impact resistance, etc., to moldings obtained from aliphatic polyamides.

Under these circumstances, various improvements on aromatic polyamides also have been attempted. Examples thereof include the compositions described in, e.g., JP-A-3-285951, JP-A-4-198264, JP-A-5-43768, JP-A-5-117525, JP-A-58-120665, JP-A-1-98665, and JP-A-2-240162. (The term "JP-A" as used herein means an "unexamined published Japanese patent application.") Although these crystalline aromatic copolyamides (copolymer polyamide composed of two components) have high heat resistance and some degree of toughness, they are still insufficient for use in the aforementioned applications.

As another means for mitigating the problem described above, a half-aromatic polyamide has been proposed which is a polyamide produced by adding an aromatic polyamide to an aliphatic polyamide, followed by polycondensation.

This half-aromatic polyamide has low water absorption unlike aliphatic polyamides, so that use of the half-aromatic polyamide is effective in eliminating the above-described problem that moldings undergo fluctuations in dimension, physical properties, etc. upon water absorption. Another advantage of this half-aromatic polyamide is that since it generally has a higher melting point than aliphatic polyamides, it is superior in heat resistance.

However, a close investigation on moldings obtained from the half-aromatic polyamide has revealed that these moldings are inferior in toughness, i.e., elongation, impact resistance, etc., to moldings obtained from aliphatic polyamides.

Various improvements on half-aromatic polyamides also have been attempted. For example, incorporation of a modified polyolefin into a two-component copolymer of an aliphatic polyamide having a crystallinity of 35% or higher and a glass transition point of 90° C. or higher with terephthalic acid and an aliphatic diamine is described in JP-A-3-28591; incorporation of a modified polyolefin and a stabilizer into a copolymer of terephthalic acid units/aliphatic dicarboxylic acid units and an aliphatic diamine is described in JP-A-4-198264; incorporation of an aliphatic polyamide into a two-component copolymer of hexamethylenediamine adipate and hexamethylenediamine terephthalate is described in JP-A-58-120665; and incorporation of a caprolactam into a two-component copolymer of hexamethylenediamine adipate and hexamethylenediamine terephthalate is described in JP-A-2-240162. Furthermore, a terpolymer produced from hexamethylenediamine adipate, hexamethylenediamine terephthalate, and other aliphatic diamine/aliphatic dicarboxylic acid is described in JP-A-52-62399.

However, the proposed half-aromatic polyamides described above each is basically a two-component copolymer or is a terpolymer which differs from the terpolymer polyamide according to the present invention.

Those proposed half-aromatic polyamides have high heat resistance and some degree of toughness. However, the half-aromatic polyamides, when used in the aforementioned applications, are insufficient in rigidity and required to have further improved toughness, etc. Thus, the proposed half-aromatic polyamides are not always satisfactory.

In recent years, techniques for producing automotive resin parts as substitutes for conventional metal parts have been proposed in the field of motor vehicles in order to take advantage of the advantageous properties of resin parts, such as lightweight for attaining fuel consumption reduction, non-rusting properties, and sound-insulating effect.

The automotive parts include functional parts for use in engine compartments, exterior parts, interior parts, brake fluid pipes, fuel pipes, etc. Examples thereof include radiator tanks and tops and bases thereof, brake oil tanks, washing liquid tanks, reservoir tanks, battery casings, battery trays, cylinder head covers, plug caps, power steering oil reservoirs, fan shrouds, radiator fans, vapor caniseu, oil pans, air cleaner inlets, air cleaner housings, fuse boxes, fuel filler caps, fuel filler lids, seat frames, steering housing columns, wiper motor housings, distributor housings, alternator end caps, intake manifolds, and electrical parts such as connectors and fastener clips.

Examples of the automotive parts further include functional parts such as fuel pipes, vacuum pipes, hydraulic clutch hoses, air brake lines, and car cooler hoses; and exterior parts such as bumpers, bumper corners, bumper skirt, radiator grilles, fog lamp reflectors, hoods, fenders, door panels, side mirror housings, center pillars, air outlet louvers, wheels, wheel caps, emblems, exterior trims and moldings, sliding roofs, and tail lamp rims.

Examples thereof furthermore include interior parts such as instrument panels, console boxes, steering wheels, back mirror housings, door inner panels, air duct panels, window molding fasteners, speed cable liners, belt lock strikers, sunvisor brackets, and headrest rod holders.

These parts have already come to be available as polyamide, ABS resin, polypropylene, or other resin parts, or are at present in the stage where substitution of resins for metals is being investigated. Since high dimensional accuracy is especially required of these automotive parts, the particularly important property requirements include reduced molding shrinkage, little dimensional change with water absorption, and low coefficient of linear expansion.

Polyamide resins have long been used as automotive parts. In particular, nylon 6, nylon 66, nylon 11, and nylon 12 have been used as many of the aforementioned automotive parts because of their high heat resistance and other advantages. However, nylon 6 and nylon 66 have a problem that they suffer a considerable dimensional change upon water absorption due to their high water absorption. Nylon 11 and nylon 12, although reduced in dimensional change with water absorption, have problems that they are inferior in heat resistance to nylon 6 and nylon 66 and have a high coefficient of linear expansion and a high degree of molding shrinkage.

In addition, the recent advance in the level of heat resistance required of automotive parts has posed a problem that the conventional nylon 66 or nylon 6 resins reinforced with an inorganic filler such as glass fibers are insufficient in attaining the required heat resistance.

To overcome these problems, nylons having an aromatic segment incorporated in constituent units of a polyamide are being investigated. In particular, use of a crystalline copolyamide produced by the copolymerization of an equimolar salt of hexamethylenediamine with adipic acid and an equimolar salt of hexamethylenediamine with terephthalic acid as a material for automotive parts is attracting attention, because this copolyamide combines high heat resistance and low water absorption. However, this crystalline copolyamide has a high degree of molding shrinkage and gives molded parts which suffer warpage and are insufficient in dimensional change with water absorption.

The crystalline copolyamide described above has a higher melting point than nylon 66 and nylon 6, so that its distortion temperature under load is exceedingly high when reinforced with an inorganic filler. Since such properties are on or above the heat resistance level required of recent automotive parts, applications of the filler-reinforced crystalline copolyamide to various automotive parts are being investigated.

However, this crystalline copolyamide, when reinforced with an inorganic filler, has a problem that molded automotive parts obtained therefrom suffer considerable warpage and hence have insufficient dimensional accuracy. Consequently, satisfactory filler-reinforced crystalline copolyamide have not yet been obtained.

SUMMARY OF THE INVENTION

An object of the present invention is to provide a terpolymer polyamide having excellent physical properties and dimensional stability.

Another object of the present invention is to provide a polyamide resin composition which retains the heat resistance and low water absorption of aromatic and half-aromatic polyamides, is excellent in toughness unlike the conventional aromatic and half-aromatic polyamides, and shows excellent flowability during injection molding.

Still another object of the present invention is to provide an automotive part which comprises a molding of the above-described terpolymer polyamide or polyamide resin composition and has excellent physical properties and dimensional stability.

Other objects and effects of the present invention will be apparent from the following description.

As a result of investigations made by the present inventors in order to attain the above objects, it has been found that these objects can be accomplished with a crystalline terpolymer polyamide comprising aliphatic components and aromatic components, a polyamide resin composition containing the polyamide, and automotive parts obtained from these.

The present invention relates to, as a first aspect, a crystalline terpolymer polyamide produced from: (a) an equimolar salt of hexamethylenediamine with adipic acid, (b) an equimolar salt of hexamethylenediamine with terephthalic acid, and (c) 12-aminododecanoic acid or ω-laurolactam.

The present invention also relates to, as a second aspect, a polyamide resin composition comprising from 65 to 95% by weight (A) the crystalline terpolymer polyamide of the first aspect and from 5 to 35% by weight (B) a modified polyolefin produced by graft-polymerizing an α, β-unsaturated carboxylic acid or an anhydride or derivative thereof with a polyolefin.

The present invention further relates to, as a third aspect, a polyamide resin composition comprising from 50 to 92% by weight The crystalline terpolymer polyamide of the first aspect, from 5 to 35% by weight the modified polyolefin used in the second aspect, and from 3 to 15% by weight (C) polyamide 12.

The present invention further relates to, as a fourth aspect a polyamide resin composition comprising (A) the crystalline terpolymer polyamide of the first aspect and (D) an inorganic filler and/or a flame retardant.

The present invention further relates to, as a fifth aspect, an automotive part comprising a molding any of one of the crystalline terpolymer polyamide according to the first aspect and the polyamide resin compositions according to the second, third, and fourth aspects.

DETAILED DESCRIPTION OF THE INVENTION

Figure 1:
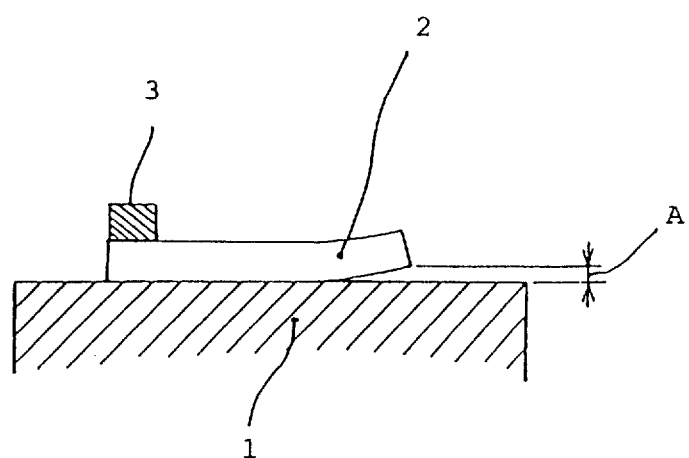
FIG. 1 illustrates the method used in Examples and Comparative Examples for measuring the warpage of a box-shaped molding.

The crystalline terpolymer polyamide (A) of the present invention is produced from (a) an equimolar salt of hexamethylenediamine with adipic acid, (b) an equimolar salt of hexamethylenediamine with terephthalic acid, and (c) 12-aminododecanoic acid or ω-laurolactam.

The equimolar salt (a) of hexamethylenediamine with adipic acid used herein generally means a salt that is synthesized in such a manner that an aqueous solution containing both hexamethylenediamine and adipic acid at 80° C. is adjusted to have a pH of 7.1. When this equimolar salt is used in polymerization, part of the hexamethylenediamine flows out along with water removed from the polymerization system. It is therefore preferred to use a salt in which the molar proportions of hexamethylenediamine and adipic acid differ slightly, e.g., the proportion of hexamethylenediamine is larger by about 1% by mole based on the amount of the equimolar salt used for polymerization.

The equimolar salt (b) of hexamethylenediamine with terephthalic acid used herein generally means a salt synthesized in such a manner that an aqueous solution of both hexamethylenediamine and terephthalic acid at 80° C. is adjusted to have a pH of 6.9. It is preferred to use a salt in which the molar proportions of hexamethylenediamine and terephthalic acid differ slightly, e.g., the proportion of hexamethylenediamine is larger by about 1% by mole based on the amount of the equimolar salt used for polymerization because of the reason described above.

The ω-laurolactam (c) is not particularly limited as to whether the compound is used as it is or after being converted to 12-aminododecanoic acid through ring opening.

The proportions of ingredients (a), (b), and (c) used for producing the crystalline terpolymer polyamide of the present invention are preferably from 20 to 80% by weight, from 20 to 80% by weight, and from 1 to 30% by weight, respectively, based on the total amount of the three ingredients. The proportions of ingredients (a), (b), and (c) are particularly preferably from 25 to 75% by weight, from 25 to 75% by weight, and from 5 to 20% by weight, respectively, based on the total amount of these ingredients.

If the proportion of ingredient (a) is smaller than 20% by weight and that of ingredient (b) is larger than 80% by weight, the melting point of the resulting crystalline terpolymer polyamide is so high that the polyamide disadvantageously tends to suffer pyrolysis during molding. If the proportion of ingredient (a) is larger than 80% by weight and that of ingredient (b) is smaller than 20% by weight, the resulting polyamide may disadvantageously give moldings having increased water absorption. Proportions of ingredient (c) smaller than 1% by weight are not preferred in that less effect of improving tensile elongation is obtained and the resulting crystalline terpolymer polyamide tends to have impaired physical properties. Proportions of ingredient (c) larger than 30% by weight are not preferred in that not only crystallinity decreases considerably to result in a prolonged cycle time in injection molding, but also the resulting polyamide has a lowered melting point and hence low heat resistance.

For producing the crystalline terpolymer polyamide of this invention, the sequence of polymerization reactions is not particularly limited and any desired method may be employed. Examples thereof include a method in which ingredients (a), (b), and (c) are copolymerized simultaneously; a method in which ingredients (a) and (b) are copolymerized first and ingredient (c) is then copolymerized; a method in which ingredients (a) and (c) are copolymerized first and ingredient (b) is then copolymerized; and a method in which ingredients (b) and (c) are copolymerized first and ingredient (a) is then copolymerized.

For example, a method may be employed, which comprises introducing ingredients (a), (b), and (c) into a pressure polymerizer equipped with a stirrer; heating the contents to a given temperature to obtain a precopolymer having a molecular weight of from 1,500 to 3,000; and then conducting post-polymerization using an extruder at a temperature slightly higher than the melting point of the precopolymer to produce a crystalline terpolymer.

The crystalline terpolymer polyamide of the present invention has been ascertained to be a terpolymer of the above-described ingredients (a), (b), and (c) by means of the following analyses. That is, the crystalline terpolymer polyamide has one distinct melting point, which shifts to some degree depending on comonomer proportions, and the absorption peaks characteristic of the polyamide are observed by $C^{13}$ nuclear magnetic resonance spectrometry.

The molecular weight of the crystalline terpolymer polyamide of the present invention is not particularly limited but is preferably such a value that the physical properties thereof are not considerably impaired. If the molecular weight is too low, the impact strength and the tensile strength are disadvantageously decreased.

The modified polyolefin (B) for use in the second and third aspects of the present invention generally means those produced by grafting an α, β-unsaturated carboxylic acid or an anhydride or derivative thereof onto a polymer of an α-olefin having 2 or more carbon atoms, especially from 2 to 18 carbon atoms. Examples of the α-olefin include ethylene, propylene, 1-butene, 1-hexene, 1-decene, and 1-pentene. These α-olefins may be used alone or in combination of two or more thereof. Ethylene is especially preferably used.

Examples of the α, β-unsaturated carboxylic acid or anhydride or derivative thereof used for the graft modification of the poly(α-olefin) include monobasic carboxylic acids such as acrylic acid, methacrylic acid, crotonic acid, and isophthalic acid; dibasic carboxylic acids such as maleic acid, fumaric acid, itaconic acid, and citraconic acid; and anhydrides or salts of these acids. Preferred are acrylic acid, methacrylic acid, maleic anhydride, itaconic anhydride, and the zinc salts and sodium salts thereof. Especially preferably used are maleic anhydride and itaconic anhydride.

The content of the α, β-unsaturated carboxylic acid or anhydride or derivative thereof is preferably from 0.05 to 5 mol %, especially preferably from 0.1 to 3 mol %, based on the amount of the poly(α-olefin). Contents smaller than the lower limit are not preferred in that adhesion between the polyamide phase and the polyolefin phase tends to be insufficient, so that the resin composition obtained may have an unstable structure and reduced mechanical strength. Contents exceeding the upper limit are not preferred because the resin composition obtained may have poor flowability in molding.

The graft-modification of a polyolefin may be accomplished by mixing the polyolefin in a molten or solution state with the α, β-unsaturated carboxylic acid or anhydride or derivative thereof with heating along with a free-radical generator.

The polyamide 12 (C) for use in the third aspect of the present invention generally means a polymer obtained by polymerizing ω-laurolactam or 12-aminododecanoic acid, which preferably has a number-average molecular weight of from 8,000 to 40,000, more preferably from 9,000 to 25,000.

Number-average molecular weights of the polyamide 12 lower than the lower limit are not preferred in that physical properties, especially toughness, of the resin composition tends to be impaired. Number-average molecular weights thereof higher than the upper limit are not preferred in that flowability during injection molding tends to be reduced. The polyamide 12 may contain additives such as those for improving heat resistance and weatherability.

The incorporation of polyamide 12 is effective in imparting a well balanced combination of water absorption and rigidity to the polyamide resin composition obtained by the present invention. That is, polyamide resin compositions to which polyamide 12 has not been added should contain a larger proportion of the modified polyolefin so as to attain reduced water absorption. However, the incorporation of the modified polyolefin in a larger proportion may result in reduced rigidity. Thus, polyamide 12 is incorporated in order to obtain a polyamide resin composition combining low water absorption and high rigidity.

In the polyamide resin composition according to the second aspect of the present invention, the proportions of the crystalline terpolymer polyamide component (A) and the modified polyolefin component (B) are preferably from 65 to 95% by weight and from 5 to 35% by weight, respectively, based on the total amount of components (A) and (B). The especially preferred ranges of the-proportions of the polyamide component (A) and the modified polyolefin component (B) are from 70 to 90% by weight and from 10 to 30% by weight, respectively, based on the total amount of components (A) and (B).

If the proportion of the polyamide component (A) is smaller than 65% by weight, the heat resistance characteristic of the crystalline terpolymer polyamide may be reduced. If the proportion of the polyamide component (A) exceeds 95% by weight, less effect of improving impact resistance is observed.

The polyamide resin composition (100 parts by weight in total) according to the third aspect of the present invention is obtained by blending the crystalline terpolymer polyamide (A) with the modified polyolefin (B) and polyamide 12 (C) in the following proportions.

The amounts of components (A), (B), and (C) incorporated in the polyamide resin composition according to the third aspect of the present invention are from 50 to 92% by weight, from 5 to 35% by weight, and from 3 to 15% by weight, respectively, based on the total amount of components (A), (B), and (C).

Component (A) amounts smaller than 50% by weight are undesirable in that the heat resistance and mechanical properties of the polyamide resin composition are impaired, while amounts thereof larger than 92% by weight are undesirable because toughness is reduced. Component (B) amounts smaller than 5% by weight are undesirable because toughness is reduced, while amounts thereof larger than 35% by weight are undesirable in that mechanical properties and heat resistance are impaired. Component (C) amounts smaller than 3% by weight are undesirable because this results in moldings which undergo an enhanced dimensional change, while amounts thereof larger than 15% by weight are undesirable in that heat resistance is reduced.

Examples of the inorganic filler which may be used as component (D) in the fourth aspect of the present invention include glass fibers, asbestos fibers, carbon fibers, calcium carbonate, talc, magnesium oxide, aluminum oxide, wollastonite, mica, and potassium titanate.

The addition amount of the inorganic filler is preferably from 3 to 70 parts by weight, preferably from 5 to 60 parts by weight, per 100 parts by weight of the crystalline terpolymer polyamide. Amounts of the inorganic filler smaller than 3 parts by weight are not preferred because less effect is produced by the incorporation of the inorganic filler, while amounts thereof larger than 70 parts by weight are not preferred in that such a composition tends to give moldings which have a considerably impaired appearance because of the presence of fibers or particles of the inorganic filler on the molding surface.

Examples of the flame retardant which may be used as component (D) in the fourth aspect of the present invention include halogenated compounds and antimony compounds. Specific examples of the halogenated compounds include brominated phenoxy resins, brominated polystyrene, brominated polycarbonates, chlorinated polystyrene, and chlorinated polyethylene. Specific examples of the antimony compounds include antimony trioxide and antimony tetroxide.

The addition amount of the halogenated compound is preferably from 1 to 40 parts by weight, more preferably from 5 to 35 parts by weight, per 100 parts by weight of the crystalline terpolymer polyamide. Amounts thereof smaller than 1 part by weight are not preferred because insufficient flame retardancy results. Amounts thereof larger than 40 parts by weight are not preferred in that moldings having impaired physical properties result.

The addition amount of the antimony compound is preferably from 1 to 40 parts by weight, more preferably from 3 to 30 parts by weight, per 100 parts by weight of the crystalline terpolymer polyamide. Amounts thereof smaller than 1 part by weight are not preferred because insufficient flame retardancy results. Amounts thereof larger than 40 parts by weight are not preferred in that moldings having impaired physical properties result.

The polyamide resin composition of the present invention may be produced by melt-kneading the ingredients by means of a single-screw, twin-screw, or multi-screw extruder. A kneader or another device is also usable. The kneading means is not particularly limited.

Other additives may be used as long as the properties of the resin composition are not impaired. Examples of the additives include pigments, dyes, heat resistance-improving agents, antioxidants, weatherability-improving agents, lubricants, nucleating agents, antistatic agents, plasticizers, and other polymers.

The resin composition of the present invention can be formed into various moldings by known molding techniques such as, e.g., injection molding, extrusion molding, blow molding, vacuum forming, and press molding. The resin composition of the present invention is especially useful in the field of injection molding and blow molding.

The moldings thus obtained are not limited in shape. For example, the moldings are suitable for use not only as interior and exterior automotive parts, automotive parts for use in engine compartments, and parts for automotive electrical equipment, but also as electrical or electronic parts, in power tools, and as general-purpose industrial parts and mechanical parts such as gears and cams.

In the resin composition of the present invention, it is necessary that the crystalline terpolymer polyamide should constitute a matrix phase. Due to the polyamide component (A) constituting the continuous phase, the excellent heat resistance and mechanical properties of the polyamide can be imparted. If the polyamide component (A) constitutes a discontinuous phase, the resin composition obtained has impaired mechanical strength and reduced heat resistance, so that the objects of the invention cannot be attained.

The automotive part according to the fifth aspect of the present invention is molded from any of the crystalline terpolymer polyamide and polyamide resin compositions described above by a known molding technique such as, e.g., injection molding, extrusion molding, blow molding, vacuum forming, or press molding. Especially useful are injection-molded or extruded automotive functional parts, interior and exterior automotive parts, and other parts. The molded parts thus obtained may be subjected to post-processing such as coating, vapor deposition, adhesive bonding, etc.

In the case where the terpolymer polyamide of this invention is formed into automotive parts, other ingredients may be incorporated thereinto as long as the moldability and properties thereof are not impaired. For example, the additives used with the resin composition of this invention may be used, such as pigments, dyes, heat resistance-improving agents, antioxidants, weatherability-improving agents, lubricants, nucleating agents, antistatic agents, plasticizers, and other polymers.

The conditions for molding the crystalline terpolymer polyamide or the polyamide resin composition are not particularly limited. It is preferred that the cylinder temperature of a molding apparatus is higher than the melting point of the crystalline terpolymer polyamide or the polyamide resin composition, and the mold temperature is from 0° to 100° C. If the mold temperature is higher than 100° C., the time required for solidifying the terpolymer polyamide or the resin composition becomes long. If the mold temperature is lower than 0° C., the crystallinity of the resulting molding disadvantageously lowered, resulting in insufficient physical properties.

The present invention will be explained in more detail by reference to Examples and Comparative Examples, but the invention should not be construed as being limited thereto.

The test pieces used were examined for physical properties by the following methods.

(1) Relative viscosity:

Relative viscosity was measured according to JIS K6810.

(2) Tensile test:

Tensile test was conducted according to ASTM D638.

(3) Bending test:

Bending test was conducted according to ASTM D790.

(4) Water absorption:

Water absorption was measured according to ASTM D570.

(5) Impact test:

Impact test was conducted according to ASTM D256.

(6) Heat distortion temperature:

Heat distortion temperature was measured according to ASTM D256 at a load of 4.6 kg.

(7) Crystallinity:

Crystallinity was evaluated based on as to whether the sample showed a distinct endothermic peak due to melting (melting point) and a distinct exothermic peak due to crystallization (crystallization point) when heated and cooled at a rate of 10° C./min in a DSC manufactured by Seiko Denshi K.K.

(8) $C^{13}$-NMR:

$C^{13}$-NMR measurement was made on a 20% by weight sample solution in 97% heavy sulfuric acid as solvent at a frequency of 100.536 MHz using NMR apparatus JNM-EX400WB, manufactured by JEOL Ltd. As a result, the polyamide was ascertained to be a terpolymer polyamide having characteristic absorption peaks at 172.5 ppm, 178.7 ppm, and 180.3 ppm.

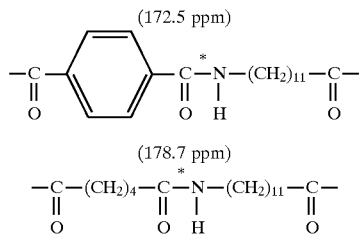

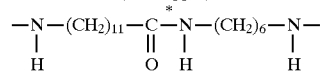

(9) Dimensional change by water absorption:

Dimensional change by water absorption was measured in the following manner: An injection-molded sample in the form of a plate having a thickness of 3.0 mm, a width of 80.0 mm, and a length of 80.0 mm was examined for dimensional change after the sample came to have an equilibrium water content under conditions of 23° C. and 65% RH.

(10) Coefficient of linear expansion:

Coefficient of linear expansion was measure in the following manner: An injection-molded test sample in the form of a cylinder having a length of 19.5 mm and a sectional area of 10.0 $mm^2$ was examined for coefficient of linear expansion in heating from −30° C. to 30° C. using TMA-SS, manufactured by Seiko Denshi K.K.

(11) Molding shrinkage:

Molding shrinkage was measure in the following manner: An injection-molded test piece in the form of a plate having a thickness of 3.0 mm, a width of 80.0 mm, and a length of 80.0 mm was allowed to stand in a dry state for one week to measure the degree of shrinkage.

(12) Warpage:

Warpage of an injection-molded sample in the form of a box having a wall thickness of 2.0 mm, a width of 30.0 mm, a length of 210.0 mm, and a depth of 40.0 mm after molding was measured according to the method shown in FIG. 1. The box-shaped sample 2 was placed on a platen 1 and a weight 3 was placed on one end of the sample 2. The degree of warpage A at the other end of the sample 2 was measured with a slide caliper.

EXAMPLE 1

A mixture of 48.5% by weight equimolar hexamethylenediamine/adipic acid salt, 48.5% by weight equimolar hexamethylenediamine/terephthalic acid salt, and 3% by weight 12-aminododecanoic acid was prepared. This mixture was melted and pre-polymerized with heating in a pressure polymerizer equipped with a stirrer. The resulting prepolymer was post-polymerized in a twin-screw extruder to obtain a polymer in the form of strands, which was then pelleted with a pelletizer. The crystalline terpolymer polyamide obtained had a relative viscosity of 2.52, a melting point of 290° C., and a crystallization point of 254° C. After being vacuum-dried, the pellets were formed into test pieces for physical property measurements using an injection molding machine under conditions of a cylinder temperature of 310° C. and a mold temperature of 40° C. The evaluation results obtained are summarized in Table 1.

EXAMPLE 2

A mixture of 45% by weight equimolar hexamethylenediamine/adipic acid salt, 45% by weight equimolar hexamethylenediamine/terephthalic acid salt, and 10% by weight 12-aminododecanoic acid was prepared. This mixture was melted and pre-polymerized with heating in a pressure polymerizer equipped with a stirrer. The resulting prepolymer was post-polymerized in a twin-screw extruder to obtain a polymer in the form of strands, which was then pelleted with a pelletizer. The crystalline terpolymer polyamide obtained had a relative viscosity of 2.49, a melting point of 283° C., and a crystallization point of 234°

C. After being vacuum-dried, the pellets were formed into test pieces for physical property measurements using an injection molding machine under conditions of a cylinder temperature of 310° C. and a mold temperature of 40° C. The evaluation results obtained are summarized in Table 1.

EXAMPLE 3

A mixture of 57% by weight equimolar hexamethylenediamine/adipic acid salt, 38% by weight equimolar hexamethylenediamine/terephthalic acid salt, and 5% by weight 12-aminododecanoic acid was prepared. This mixture was melted and pre-polymerized with heating in a pressure polymerizer equipped with a stirrer. The resulting prepolymer was post-polymerized in a twin-screw extruder to obtain a polymer in the form of strands, which was then pelleted with a pelletizer. The crystalline terpolymer polyamide obtained had a relative viscosity of 2.55, a melting point of 275° C., and a crystallization point of 244° C. After being vacuum-dried, the pellets were formed into test pieces for physical property measurements using an injection molding machine under conditions of a cylinder temperature of 290° C. and a mold temperature of 40° C. The evaluation results obtained are summarized in Table 1.

EXAMPLE 4

A mixture of 51% by weight equimolar hexamethylenediamine/adipic acid salt, 34% by weight equimolar hexamethylenediamine/terephthalic acid salt, and 15% by weight 12-aminododecanoic acid was prepared. This mixture was melted and pre-polymerized with heating in a pressure polymerizer equipped with a stirrer. The resulting prepolymer was post-polymerized in a twin-screw extruder to obtain a polymer in the form of strands, which was then pelleted with a pelletizer. The crystalline terpolymer polyamide obtained had a relative viscosity of 2.51, a melting point of 255° C., and a crystallization point of 210° C. After being vacuum-dried, the pellets were formed into test pieces for physical property measurements using an injection molding machine under conditions of a cylinder temperature of 275° C. and a mold temperature of 40° C. The evaluation results obtained are summarized in Table 1.

EXAMPLE 5

A mixture of 66.5% by weight equimolar hexamethylenediamine/adipic acid salt, 28.5% by weight equimolar hexamethylenediamine/terephthalic acid salt, and 5% by weight 12-aminododecanoic acid was prepared. This mixture was melted and pre-polymerized with heating in a pressure polymerizer equipped with a stirrer. The resulting prepolymer was post-polymerized in a twin-screw extruder to obtain a polymer in the form of strands, which was then pelleted with a pelletizer. The crystalline terpolymer polyamide obtained had a relative viscosity of 2.50, a melting point of 268° C., and a crystallization point of 228° C. After being vacuum-dried, the pellets were formed into test pieces for physical property measurements using an injection molding machine under conditions of a cylinder temperature of 290° C. and a mold temperature of 40° C. The evaluation results obtained are summarized in Table 1.

TABLE 1

| Example | 1 | 2 | 3 | 4 | 5 |
|---|---|---|---|---|---|
| Relative viscosity | 2.52 | 2.49 | 2.55 | 2.51 | 2.50 |
| Melting point (°C.) | 290 | 283 | 275 | 255 | 268 |
| Crystallization point (°C.) | 254 | 234 | 244 | 210 | 228 |
| Tensile strength (kg/cm$^2$) | 830 | 790 | 730 | 650 | 710 |
| Flexural modulus (kg/cm$^2$) | 29,000 | 28,500 | 24,800 | 23,800 | 24,000 |
| Water absorption (%) | 0.75 | 0.60 | 1.10 | 0.85 | 1.60 |
| Dimensional change by water absorption (%) | 0.06 | 0.51 | 0.88 | 0.71 | 0.38 |
| Coefficient of linear expansion (°C.$^{-1}$) | 6.2 × 10$^{-5}$ | 6.3 × 10$^{-5}$ | 6.9 × 10$^{-5}$ | 1.0 × 10$^{-5}$ | 7.8 × 10$^{-5}$ |
| Molding shrinkage (%) | 0.85 | 0.71 | 1.01 | 0.80 | 1.25 |

COMPARATIVE EXAMPLE 1

A mixture of 50 parts by weight of an equimolar hexamethylenediamine/adipic acid salt and 50 parts by weight of an equimolar hexamethylenediamine/terephthalic acid salt was melted and pre-polymerized with heating in a pressure polymerizer equipped with a stirrer. The resulting prepolymer was post-polymerized in a twin-screw extruder to obtain a polymer in the form of strands, which was then pelleted with a pelletizer. The copolyamide obtained had a relative viscosity of 2.50, a melting point of 294° C., and a crystallization point of 255° C. After being vacuum-dried, the pellets were formed into test pieces for physical property measurements using an injection molding machine under conditions of a cylinder temperature of 320° C. and a mold temperature of 40° C. The evaluation results obtained are summarized in Table 2.

COMPARATIVE EXAMPLE 2

A mixture of 60 parts by weight of an equimolar hexamethylenediamine/adipic acid salt and 40 parts by weight of an equimolar hexamethylenediamine/terephthalic acid salt was melted and pre-polymerized with heating in a pressure polymerizer equipped with a stirrer. The resulting prepolymer was post-polymerized in a twin-screw extruder to obtain a polymer in the form of strands, which was then pelleted with a pelletizer. The copolyamide obtained had a relative viscosity of 2.51, a melting point of 284° C., and a crystallization point of 250° C. After being vacuum-dried, the pellets were formed into test pieces for physical property measurements using an injection molding machine under conditions of a cylinder temperature of 310° C. and a mold temperature of 40° C. The evaluation results obtained are summarized in Table 2.

COMPARATIVE EXAMPLE 3

A mixture of 70 parts by weight of an equimolar hexamethylenediamine/adipic acid salt and 30 parts by weight of an equimolar hexamethylenediamine/terephthalic acid salt was melted and pre-polymerized with heating in a pressure polymerizer equipped with a stirrer. The resulting prepolymer was post-polymerized in a twin-screw extruder to obtain a polymer in the form of strands, which was then pelleted with a pelletizer. The copolyamide obtained had a relative viscosity of 2.50, a melting point of 272° C., and a crystallization point of 234° C. After being vacuum-dried, the pellets were formed into test pieces for physical property measurements using an injection molding machine under conditions of a cylinder temperature of 300° C. and a mold temperature of 40° C. The evaluation results obtained are summarized in Table 2.

TABLE 2

| Comparative Example | 1 | 2 | 3 |
|---|---|---|---|
| Relative viscosity | 2.50 | 2.51 | 2.50 |
| Melting point (°C.) | 294 | 284 | 272 |
| Crystallization point (°C.) | 255 | 250 | 234 |
| Tensile strength (kg/cm$^2$) | 840 | 790 | 750 |
| Flexural modulus (kg/cm$^2$) | 29,600 | 25,400 | 24,600 |
| Water absorption (%) | 0.8 | 1.3 | 1.8 |
| Dimensional change by water absorption (%) | 0.06 | 0.10 | 0.44 |
| Coefficient of linear expansion (°C.$^{-1}$) | $6.5 \times 10^{-5}$ | $7.2 \times 10^{-5}$ | $7.8 \times 10^{-5}$ |
| Molding shrinkage (%) | 1.0 | 1.2 | 1.5 |

EXAMPLE 6

A blend of 80% by weight the crystalline terpolymer polyamide obtained in Example 1 and, as a modified polyolefin, 20% by weight XZ488 manufactured by Ube Industries, Ltd., which is an LLDPE (linear low density polyethylene) graft-modified with 1 mol % maleic anhydride, was melt-kneaded at 315° C. using a twin-screw extruder (TEX44, manufactured by The Japan Steel Works, Ltd.) and pelleted. The pellets were dried and then evaluated. The results obtained are summarized in Table 3.

EXAMPLE 7

A polyamide resin composition was obtained by melt-kneading a blend of 80% by weight the crystalline terpolymer polyamide obtained in Example 2 and 20% by weight XZ488 used in Example 6 as a modified polyolefin, in the same manner as in Example 6. This composition was evaluated. The results obtained are shown in Table 3.

EXAMPLE 8

A polyamide resin composition was obtained by melt-kneading a blend of 80% by weight the crystalline terpolymer polyamide obtained in Example 3 and 20% by weight XZ488 used in Example 6 as a modified polyolefin, in the same manner as in Example 6. This composition was evaluated. The results obtained are shown in Table 3.

EXAMPLE 9

A polyamide resin composition was obtained by conducting melt-kneading in the same manner as in Example 6, except that 80% by weight the crystalline terpolymer polyamide obtained in Example 1 and 20% by weight polypropylene graft-modified with 0.4 mol % maleic anhydride (manufactured by Ube Industries, Ltd.) as a modified polyolefin were used. This resin composition was evaluated. The results obtained are shown in Table 3.

COMPARATIVE EXAMPLE 4

A polyamide resin composition was obtained by melt-kneading a blend of 80% by weight the crystalline copolyamide obtained in Comparative Example 1 and 20% by weight XZ488 used in Example 6 as a modified polyolefin, in the same manner as in Example 6. This composition was evaluated. The results obtained are shown in Table 3.

COMPARATIVE EXAMPLE 5

A polyamide resin composition was obtained by melt-kneading a blend of 80% by weight the crystalline copolyamide obtained in Comparative Example 2 and 20% by weight XZ488 used in Example 6 as a modified polyolefin, in the same manner as in Example 6. This composition was evaluated. The results obtained are shown in Table 3.

COMPARATIVE EXAMPLE 6

A polyamide resin composition was obtained by melt-kneading a blend of 80% by weight the crystalline aromatic copolyamide used in Comparative Example 4 and 20% by weight the modified polypropylene used in Example 9, in the same manner as in Example 6. This composition was evaluated. The results obtained are shown in Table 3.

TABLE 3

| | Example | | | | Comparative Example | | |
|---|---|---|---|---|---|---|---|
| | 6 | 7 | 8 | 9 | 4 | 5 | 6 |
| Tensile strength (MPa) | 55 | 50 | 50 | 58 | 55 | 50 | 55 |
| Tensile elongation (%) | 150 | 190 | 190 | 110 | 85 | 100 | 40 |
| Flexural strength (MPa) | 75 | 71 | 68 | 77 | 75 | 70 | 75 |
| Flexural modulus (GPa) | 1.90 | 1.82 | 1.78 | 2.00 | 1.91 | 1.80 | 1.90 |
| Impact strength (J/m) (Izod, notched) | 150 | 210 | 250 | 120 | 100 | 110 | 50 |
| Water absorption (%) | 0.5 | 0.3 | 0.6 | 0.5 | 0.6 | 0.7 | 0.6 |

EXAMPLE 10

A mixture of 48.5% by weight equimolar hexamethylenediamine/adipic acid salt, 48.5% by weight equimolar hexamethylenediamine/terephthalic acid salt, and 3% by weight 12-aminododecanoic acid was introduced into a pressure polymerizer equipped with a stirrer. This mixture was pre-polymerized under high-temperature high-pressure conditions of 250° C. and 22 kg/cm$^2$G. The prepolymer obtained had a relative viscosity of 1.25. This prepolymer was post-polymerized at 320° C. in a twin-screw extruder having an L/D ratio of 60 (UME55, manufactured by Ube Industries, Ltd.) to obtain a polymer in the form of strands, which was then pelleted with a pelletizer. The copolymer obtained had a relative viscosity of 2.52, a melting point of 290° C., and a crystallization point of 254° C. A C$^{13}$-NMR spectrum thereof had absorption peaks at 172.5 ppm, 178.7 ppm, and 180.3 ppm characteristic of terpolymer polyamides.

A mixture of 75 parts by weight of the crystalline terpolymer polyamide obtained above, 15 parts by weight of a modified polyethylene obtained by graft-modifying polyethylene with 1 mol % maleic anhydride, and 10 parts by weight of polyamide 12 was melt-kneaded at 315° C. using a twin-screw extruder (TEX44, manufactured by The Japan Steel Works, Ltd.), pelleted, and then dried to obtain a polyamide resin composition. The evaluation results obtained are shown in Table 4.

EXAMPLE 11

A crystalline terpolymer polyamide was obtained under the same conditions as in Example 10, except that a mixture of 45% by weight equimolar hexamethylenediamine/adipic acid salt, 45% by weight equimolar hexamethylenediamine/terephthalic acid salt, and 10% by weight 12-aminododecanoic acid was introduced into the polymerizer. The prepolymer had a relative viscosity of 1.23, while the crystalline terpolymer polyamide obtained by post-polymerization had a relative viscosity of 2.49, a melting point of 283° C., and a crystallization point of 234° C.

A mixture of 75 parts by weight of the crystalline terpolymer polyamide obtained above, 15 parts by weight of a modified polyethylene (prepared in the same manner as in Example 10), and 10 parts by weight of polyamide 12 was treated in the same manner as in Example 10 to obtain a polyamide resin composition. The evaluation results obtained are shown in Table 4.

EXAMPLE 12

A crystalline terpolymer polyamide was obtained under the same conditions as in Example 10, except that a mixture of 57% by weight equimolar hexamethylenediamine/adipic acid salt, 38% by weight equimolar hexamethylenediamine/terephthalic acid salt, and 5% by weight 12-aminododecanoic acid was introduced into the polymerizer. The prepolymer had a relative viscosity of 1.23, while the crystalline terpolymer polyamide obtained by post-polymerization had a relative viscosity of 2.55, a melting point of 275° C., and a crystallization point of 244° C.

A mixture of 75 parts by weight of the crystalline terpolymer polyamide obtained above, 15 parts by weight of a modified polyethylene (prepared in the same manner as in Example 10), and 10 parts by weight of polyamide 12 was treated in the same manner as in Example 10 to obtain a polyamide resin composition. The evaluation results obtained are shown in Table 4.

EXAMPLES 13 TO 15

A crystalline terpolymer polyamide was obtained from an equimolar hexamethylenediamine/adipic acid salt, an equimolar hexamethylenediamine/terephthalic acid salt, and 12-aminododecanoic acid in the same manner as in Example 10. This polyamide was blended with a modified polyethylene and polyamide 12 in given proportions in the same manner as in Example 10 to obtain resin compositions. The evaluation results obtained are shown in Table 4.

TABLE 4

| | Example | | | | | |
|---|---|---|---|---|---|---|
| | 10 | 11 | 12 | 13 | 14 | 15 |
| 66 Salt* (% by weight) | 48.5 | 45 | 57 | 48.5 | 48.5 | 48.5 |
| 6T Salt** (% by weight) | 48.5 | 45 | 38 | 48.5 | 48.5 | 48.5 |
| ADA*** (% by weight) | 3 | 10 | 5 | 3 | 3 | 3 |
| Relative viscosity | 2.52 | 2.49 | 2.55 | 2.52 | 2.52 | 2.52 |
| Melting point (°C.) | 290 | 283 | 275 | 290 | 290 | 290 |
| Crystallization point (°C.) | 254 | 234 | 244 | 254 | 254 | 254 |
| Terpolymer (part by weight) | 75 | 75 | 75 | 75 | 70 | 85 |
| Modified polyethylene (part by weight) | 15 | 15 | 15 | 10 | 25 | 10 |
| Polyamide 12 (part by weight) | 10 | 10 | 10 | 15 | 5 | 5 |
| Evaluation results | | | | | | |
| Tensile strength (MPa) | 55 | 48 | 52 | 58 | 52 | 60 |
| Tensile elongation (%) | 150 | 200 | 200 | 180 | 200 | 150 |
| Flexural strength (MPa) | 75 | 70 | 73 | 78 | 70 | 82 |
| Flexural modulus (GPa) | 1.91 | 1.81 | 1.88 | 2.00 | 1.80 | 2.20 |
| Impact strength (J/m) | 140 | 140 | 140 | 130 | 210 | 130 |
| Water absorption (%) | 0.50 | 0.40 | 0.48 | 0.50 | 0.43 | 0.53 |
| Heat distortion temperature (°C.) | 185 | 175 | 180 | 185 | 165 | 190 |

Note:
*66 Salt Equimolar salt of hexamethylenediamine with adipic acid
**6T Salt Equimolar salt of hexamethylenediamine with terephthalic acid
***ADA 12-aminododecanoic acid

COMPARATIVE EXAMPLES 7 TO 9

A mixture of 50% by weight equimolar hexamethylenediamine/adipic acid salt and 50% by weight equimolar hexamethylenediamine/terephthalic acid salt was pre-polymerized and post-polymerized under the same conditions as in Example 10 to obtain a crystalline copolyamide. The prepolymer had a relative viscosity of 1.25, while the polymer obtained by post-polymerization had a relative viscosity of 2.50, a melting point of 294° C., and a crystallization point of 255° C.

This crystalline copolyamide was blended with a modified polyethylene and polyamide 12 in given proportions in the same manner as in Example 10 to obtain resin compositions. The evaluation results obtained are shown in Table 5.

COMPARATIVE EXAMPLE 10

A mixture of 60% by weight equimolar hexamethylenediamine/adipic acid salt and 40% by weight equimolar hexamethylenediamine/terephthalic acid salt was pre-polymerized and post-polymerized under the same conditions as in Example 1 to obtain a crystalline copolyamide. The prepolymer had a relative viscosity of 1.24, while the polymer obtained by post-polymerization had a relative viscosity of 2.51, a melting point of 284° C., and a crystallization point of 250° C.

This crystalline copolyamide was blended with a modified polyethylene and polyamide 12 in a given proportion in the same manner as in Example 10 to obtain a resin composition. The evaluation results obtained are shown in Table 5.

COMPARATIVE EXAMPLES 11 AND 12

The crystalline terpolymer polyamide obtained in Example 10 was blended with a modified polyethylene and polyamide 12 to obtain resin compositions. The evaluation results obtained are shown in Table 5.

TABLE 5

| | Comparative Example | | | | | |
|---|---|---|---|---|---|---|
| | 7 | 8 | 9 | 10 | 11 | 12 |
| 66 Salt* (% by weight) | 50 | 50 | 50 | 60 | 48.5 | 48.5 |
| 6T Salt** (% by weight) | 50 | 50 | 50 | 40 | 48.5 | 48.5 |
| ADA*** (% by weight) | 0 | 0 | 0 | 0 | 3 | 3 |
| Relative viscosity | 2.50 | 2.50 | 2.50 | 2.51 | 2.52 | 2.52 |
| Melting point (°C.) | 294 | 294 | 294 | 284 | 290 | 290 |
| Solidifying point (°C.) | 255 | 255 | 255 | 250 | 254 | 254 |
| Copolymer (part by weight) | 75 | 60 | 85 | 75 | 40 | 95 |
| Modified polyethylene (part by weight) | 15 | 20 | 10 | 15 | 40 | 3 |
| Polyamide 12 (part by weight) | 10 | 20 | 5 | 10 | 20 | 2 |
| Evaluation results | | | | | | |
| Tensile strength (MPa) | 55 | 48 | 58 | 53 | 41 | 75 |
| Tensile elongation (%) | 80 | 140 | 50 | 90 | 200 | 20 |
| Flexural strength (MPa) | 75 | 68 | 80 | 73 | 55 | 93 |
| Flexural modulus (GPa) | 1.90 | 1.72 | 2.35 | 1.85 | 1.48 | 2.35 |
| Impact strength (J/m) | 70 | 130 | 55 | 70 | 95 | 45 |
| Water absorption (%) | 0.60 | 0.45 | 0.70 | 0.75 | 0.35 | 1.2 |
| Heat distortion temperature (°C.) | 187 | 151 | 193 | 182 | 138 | 220 |

Note:
*66 Salt Equimolar salt of hexamethylenediamine with adipic acid
**6T Salt Equimolar salt of hexamethylenediamine with terephthalic acid
***ADA 12-aminododecanoic acid The resin compositions containing the crystalline terpolymer polyamide of the present invention have a high tensile elongation, a high impact strength, and a reduced water absorption as compared with the resin compositions containing a crystalline copolyamide. Hence, the compositions according to the invention also have the effect of reducing the dimensional change of moldings (see Examples 10 to 15 and Comparative Examples 7 to 10).

Furthermore, the resin compositions which contain the crystalline terpolymer polyamide but do not satisfy the requirement concerning component proportion have a lowered heat distortion temperature (see Comparative Example 11) or have an increased water absorption to give moldings which suffer an increased dimensional change upon water absorption (Comparative Example 12).

EXAMPLES 16 AND 17

The crystalline terpolymer polyamide obtained in Example 1 was vacuum-dried. 100 Parts by weight of the dry pellets were then melt-kneaded with glass fibers (trade name ECS03T-289H, manufactured by Nippon Electric Glass Co., Ltd.) and/or a flame retardant in the respective amounts shown in Table 6 using a twin-screw extruder (TEX30, manufactured by The Japan Steel Works, Ltd.). The resulting resin compositions extruded in the form of strands were pelleted with a pelletizer, dried, and then formed into test pieces for the above-described property evaluations by means of an injection molding machine. The evaluation results obtained are summarized in Table 7.

EXAMPLES 18 AND 19

The crystalline terpolymer polyamide obtained in Example 2 was vacuum-dried, and then compounded with glass fibers and/or a flame retardant in the proportions shown in Table 6 in the same manner as in Example 16. The resulting compositions were formed into test pieces and evaluated in the same manner. The evaluation results obtained are summarized in Table 7.

EXAMPLE 20

The crystalline terpolymer polyamide obtained in Example 3 was vacuum-dried, and then compounded with glass fibers in the proportion shown in Table 6 in the same manner as in Example 16. The resulting composition was formed into test pieces and evaluated in the same manner. The evaluation results obtained are summarized in Table 7.

COMPARATIVE EXAMPLES 13 AND 14

The copolyamide obtained in Comparative Example 1 was vacuum-dried, and then compounded with glass fibers and/or a flame retardant in the proportions shown in Table 6 in the same manner as in Example 16. The resulting compositions were formed into test pieces and evaluated in the same manner. The evaluation results obtained are summarized in Table 7.

COMPARATIVE EXAMPLE 15

The copolyamide obtained in Comparative Example 2 was vacuum-dried, and then compounded with glass fibers in the proportion shown in Table 6 in the same manner as in Example 16. The resulting composition was formed into test pieces and evaluated in the same manner. The evaluation results obtained are summarized in Table 7.

TABLE 6

| | Example | | | | | Comparative Example | | |
|---|---|---|---|---|---|---|---|---|
| | 16 | 17 | 18 | 19 | 20 | 13 | 14 | 15 |
| Terpolymer polyamide | | | | | | | | |
| 66 Salt (% by weight) | 50 | 50 | 50 | 50 | 60 | 50 | 50 | 60 |

TABLE 6-continued

|  | Example | | | | | Comparative Example | | |
| --- | --- | --- | --- | --- | --- | --- | --- | --- |
|  | 16 | 17 | 18 | 19 | 20 | 13 | 14 | 15 |
| 6T Salt (% by weight) | 50 | 50 | 50 | 50 | 40 | 50 | 50 | 40 |
| 12-Amino-dodecanoic acid (part by weight) | 3 | 3 | 10 | 10 | 5 | — | — | — |
| Glass fiber |  |  |  |  |  |  |  |  |
| Kind | *1 | *1 | *1 | *1 | *1 | *1 | *1 | *1 |
| Amount (part by weight) | 30 | 30 | 30 | 30 | 30 | 30 | 30 | 30 |
| Flame retardant |  |  |  |  |  |  |  |  |
| Kind | — | Pyroguard SR-4(*2) | — | Pyroguard SR-4(*2) | — | — | Pyroguard SR-4(*2) | — |
| Amount (part by weight) | — | 26 | — | 26 | — | — | 26 | — |
| Flame retardant |  |  |  |  |  |  |  |  |
| Kind | — | Antimony trioxide | — | Antimony trioxide | — | — | Antimony trioxide | — |
| Amount (part by weight) | — | 8 | — | 8 | — | — | 8 | — |

Note:
*1 ECS03T-289H, manufactured by Nippon Electric Glass Co., Ltd.
*2 Brominated aromatic compound manufactured by Dai-ichi Kogyo Seiyaku Co., Ltd.

TABLE 7

|  | Example | | | | | Comparative Example | | |
| --- | --- | --- | --- | --- | --- | --- | --- | --- |
|  | 16 | 17 | 18 | 19 | 20 | 13 | 14 | 15 |
| Relative viscosity | 2.52 | 2.52 | 2.49 | 2.49 | 2.55 | 2.50 | 2.50 | 2.51 |
| Melting point (°C.) | 290 | 290 | 283 | 283 | 275 | 294 | 294 | 284 |
| Crystallization point (°C.) | 254 | 254 | 234 | 234 | 244 | 255 | 255 | 250 |
| Tensile strength (kg/cm$^2$) | 1,800 | 1,750 | 1,700 | 1,700 | 1,500 | 1,800 | 1,780 | 1,600 |
| Flexural modulus (kg/cm$^2$) | 85,000 | 95,000 | 82,000 | 93,000 | 80,000 | 85,000 | 95,000 | 82,000 |
| Water absorption (%) | 0.45 | 0.28 | 0.40 | 0.18 | 0.55 | 0.50 | 0.30 | 0.60 |
| Warpage (mm) (part A in FIG. 1) | 1.1 | 0.8 | 0.75 | 0.7 | 1.4 | 3.3 | 2.8 | 3.8 |

As described above, the crystalline terpolymer polyamide of the present invention and the polyamide resin compositions containing the same have excellent physical properties. Furthermore, the automotive parts molded from the crystalline terpolymer polyamide of the invention and from the polyamide resin compositions containing the polyamide have a reduced molding shrinkage, warp little, undergo little dimensional change upon water absorption, and hence have excellent dimensional stability.

While the invention has been described in detail and with reference to specific examples thereof, it will be apparent to one skilled in the art that various changes and modifications can be made therein without departing from the spirit and scope thereof.

What is claimed is:

1. A crystalline terpolymer polyamide produced from and consisting essentially of:
   (a) 20 to 80% by weight of an equimolar salt of hexamethylenediamine with adipic acid,
   (b) 20 to 80% by weight of an equimolar salt of hexamethylenediamine with terephthalic acid, and
   (c) 1 to 30% by weight of 12-aminododecanoic acid or ω-laurolactam.

2. A crystalline terpolymer polyamide as claimed in claim 1, wherein said crystalline polyamide is produced from:
   from 25 to 75% by weight said equimolar salt (a) of hexamethylenediamine with adipic acid,
   from 25 to 75% by weight said equimolar salt (b) of hexamethylenediamine with terephthalic acid, and
   from 5 to 20% by weight said 12-aminododecanoic acid or ω-laurolactam (c).

3. A polyamide resin composition consisting essentially of from 65 to 95% by weight (A) a crystalline terpolymer polyamide produced from: (a) an equimolar salt of hexamethylene diamine with adipic acid, (b) an equimolar salt of hexamethylenediamine with terephthalic acid, and (c) 12-aminododecanoic acid or ω-laurolactam and
   from 5 to 35% by weight (B) a modified polyolefin produced by graft-polymerizing an α, β-unsaturated carboxylic acid or an anhydride or derivative thereof with a polyolefin.

4. A polyamide resin composition as claimed in claim 3, wherein said crystalline terpolymer polyamide (A) is a crystalline polyamide produced from: from 20 to 80% by weight said equimolar salt (a) of hexamethylenediamine with adipic acid, from 20 to 80% by weight said equimolar salt (b) of hexamethylenediamine with terephthalic acid, and from 1 to 30% by weight said 12-aminododecanoic acid or ω-laurolactam (c).

5. A polyamide resin composition as claimed in claim 4, wherein said modified polyolefin (B) is a modified polyolefin produced by graft-polymerizing an α, β-unsaturated carboxylic acid or an anhydride or derivative thereof with polyolefin in an amount of from 0.05 to 5 mol % based on the amount of the polyolefin.

6. A polyamide resin composition as claimed in claim 3, which comprises from 70 to 90% by weight said crystalline terpolymer polyamide (A) and from 10 to 30% by weight said modified polyolefin (B).

7. A polyamide resin composition consisting essentially of
   (A) a crystalline terpolymer polyamide produced from:
      (a) an equimolar salt of hexamethylenediamine with adipic acid, (b) an equimolar salt of hexamethylenediamine with terephthalic acid, and (c) 12-aminododecanoic acid or ω-laurolactam and (D) at least one component selected from the group consisting of an inorganic filler and a flame retardant.

8. A polyamide resin composition as claimed in claim 7, wherein said component (D) is an inorganic filler, the amount of said filler being from 3 to 70 parts by weight per 100 parts by weight of said crystalline terpolymer polyamide (A).

9. A polyamide resin composition as claimed in claim 7, wherein said component (D) is a halogenated compound or an antimony compound, the amount of said compound being from 1 to 40 parts by weight per 100 parts by weight of said crystalline terpolymer polyamide (A).

10. An automotive part comprising a molding of said crystalline terpolymer polyamide as claimed in claim 1.

11. An automotive part comprising a molding of said polyamide resin composition as claimed in claim 3.

12. An automotive part comprising a molding of said polyamide resin composition as claimed in claim 7.

* * * * *